US012694139B2

(12) United States Patent
Clark et al.

(10) Patent No.: US 12,694,139 B2
(45) Date of Patent: Jul. 28, 2026

(54) METHOD AND SYSTEM FOR ACTIVATING A PCB ANALYSIS UTILIZING MANUFACTURING CAPABILITY DATA

(71) Applicant: Siemens Industry Software Inc., Plano, TX (US)

(72) Inventors: Max Clark, Dove Canyon, CA (US); Alex Zigelboim, Yavne (IL); Keren Paryenti, Yavne (IL); Tal Zur, Rishon-Lezlon (IL)

(73) Assignee: Siemens Industry Software Inc., Plano, TX (US)

( * ) Notice: Subject to any disclaimer, the term of this patent is extended or adjusted under 35 U.S.C. 154(b) by 237 days.

(21) Appl. No.: 18/546,623

(22) PCT Filed: Feb. 16, 2021

(86) PCT No.: PCT/IB2021/051288
§ 371 (c)(1),
(2) Date: Aug. 16, 2023

(87) PCT Pub. No.: WO2022/175705
PCT Pub. Date: Aug. 25, 2022

(65) Prior Publication Data
US 2024/0135013 A1   Apr. 25, 2024
US 2024/0232402 A9   Jul. 11, 2024

(51) Int. Cl.
*G06F 21/62* (2013.01)

(52) U.S. Cl.
CPC ............................... *G06F 21/6209* (2013.01)

(58) Field of Classification Search
CPC ............. G06F 21/6209; G06F 21/6218; G06F 2111/02; G06F 2115/12; G06F 2119/18; G06F 30/398
See application file for complete search history.

(56) References Cited

U.S. PATENT DOCUMENTS 7,702,636 B1 *   4/2010   Sholtis .................. G06F 16/256
                                                                707/999.1
10,020,935 B1 *   7/2018   Ghetti ................. H04L 63/0815
(Continued)

FOREIGN PATENT DOCUMENTS

CN          108133103 A       6/2018

*Primary Examiner* — Theodore C Parsons
(74) *Attorney, Agent, or Firm* — Laurence A. Greenberg; Werner H. Stemer; Ralph E. Locher

(57) ABSTRACT

A PCB analysis utilizes manufacturing capability data shared in a multi-tenant collaborative network in a mixed cloud and on-premise environment. Access to a tenant's account of a DFM application deployed on the tenant's premises is provided. The DFM application is enabled to activate the PCB analysis on a DFM profile with manufacturing capability data. The tenant's account requests a utilization authorization of a given DFM profile stored in a cloud data layer. When the utilization is authorized, the given DFM profile is downloaded embedded in a locked DFM envelope, which locks together the given DFM profile with an injected identifier of the authorized tenant's account. Via the DFM application, when logged into the tenant's account, the PCB analysis is activated by permitting the unlocking of the DFM profile from the DFM envelope only when the identifier of the tenant's account is the same as the injected identifier.

15 Claims, 5 Drawing Sheets

(56) References Cited

U.S. PATENT DOCUMENTS

| 2003/0182180 | A1 | 9/2003 | Zarrow |
| 2016/0306923 | A1 | 10/2016 | van Rooyen et al. |
| 2019/0384354 | A1 | 12/2019 | von Badinski et al. |

* cited by examiner

Figure 4:
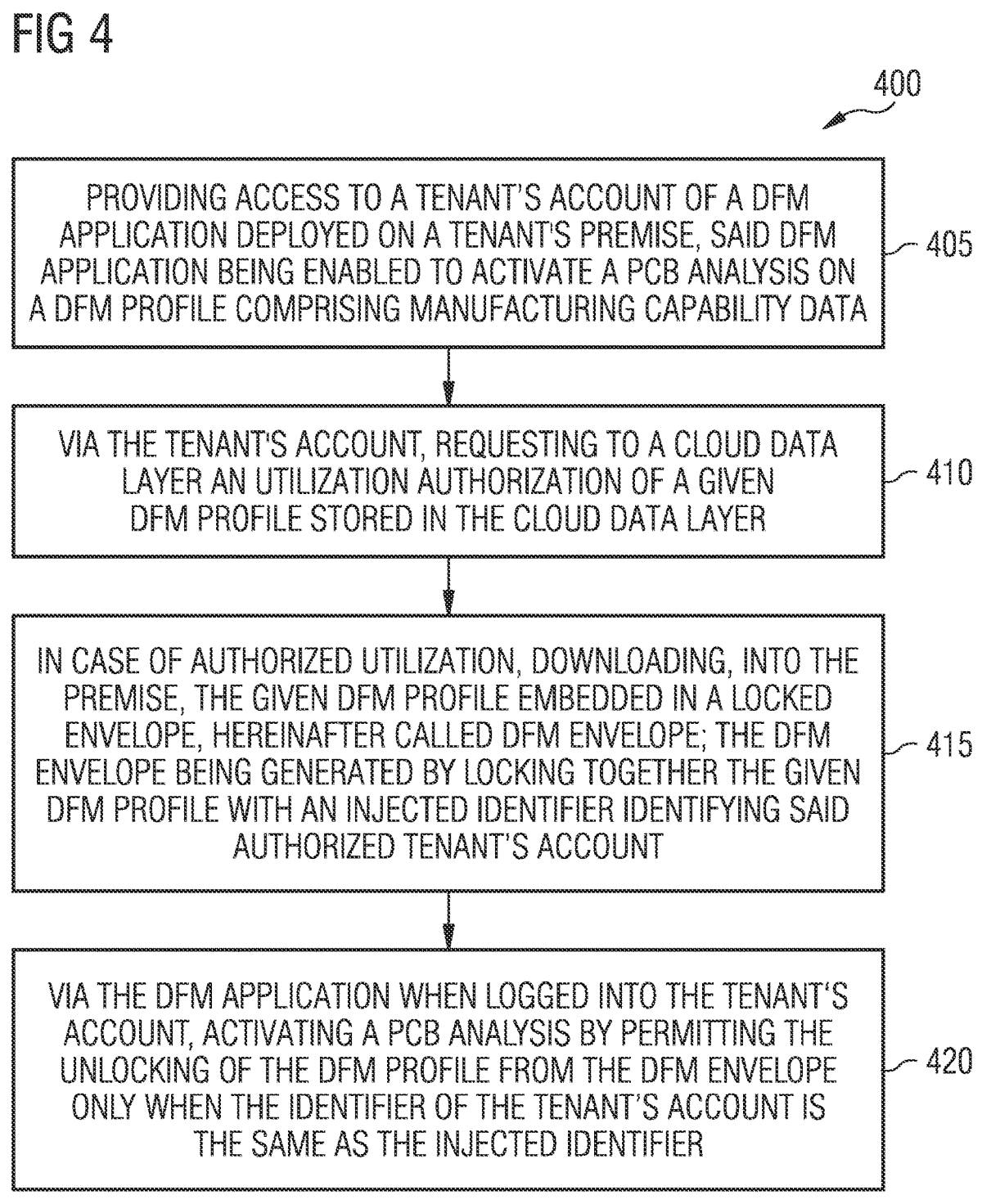

PROVIDING ACCESS TO A TENANT'S ACCOUNT OF A DFM
APPLICATION DEPLOYED ON A TENANT'S PREMISE, SAID DFM
APPLICATION BEING ENABLED TO ACTIVATE A PCB ANALYSIS ON
A DFM PROFILE COMPRISING MANUFACTURING CAPABILITY DATA — 405

VIA THE TENANT'S ACCOUNT, REQUESTING TO A CLOUD DATA
LAYER AN UTILIZATION AUTHORIZATION OF A GIVEN
DFM PROFILE STORED IN THE CLOUD DATA LAYER — 410

IN CASE OF AUTHORIZED UTILIZATION, DOWNLOADING, INTO THE
PREMISE, THE GIVEN DFM PROFILE EMBEDDED IN A LOCKED
ENVELOPE, HEREINAFTER CALLED DFM ENVELOPE; THE DFM
ENVELOPE BEING GENERATED BY LOCKING TOGETHER THE GIVEN
DFM PROFILE WITH AN INJECTED IDENTIFIER IDENTIFYING SAID
AUTHORIZED TENANT'S ACCOUNT — 415

VIA THE DFM APPLICATION WHEN LOGGED INTO THE TENANT'S
ACCOUNT, ACTIVATING A PCB ANALYSIS BY PERMITTING THE
UNLOCKING OF THE DFM PROFILE FROM THE DFM ENVELOPE
ONLY WHEN THE IDENTIFIER OF THE TENANT'S ACCOUNT IS
THE SAME AS THE INJECTED IDENTIFIER — 420

METHOD AND SYSTEM FOR ACTIVATING A PCB ANALYSIS UTILIZING MANUFACTURING CAPABILITY DATA

TECHNICAL FIELD

The present disclosure is directed, in general, to computer-aided systems for Printed Circuit Board ("PCB") design and their manufacturability analysis. More in particular, the disclosure is directed to software systems and applications for Design for Manufacturability ("DFM") analysis in the field of PCB manufacturing.

BACKGROUND OF THE DISCLOSURE

In the field of PCB design, layout design companies make use of Design for Manufacturability ("DFM") analysis software tools for validating the manufacturability of their designed PCB layouts and for achieving a reduction of their design iterations.

DFM analysis software tools typically enable to run a manufacturing capability analysis of a PCB layout design on a selected manufacturer's DFM profile.

In the art, the term DFM profile denotes a set of constraints and rules of manufacturing capabilities expected from a manufacturer, usually in form of a bound of files. A DFM profile may be for example a "generic" one for a generic standard PCB manufacturer or a specific one provided by a specific selected PCB manufacturer.

In the latter case, PCB manufacturing companies may provide their own DFM profiles on their own manufacturing capabilities to be shared exclusively with their own customers e.g. PCB designers and/or OEM companies.

Consider a multi-party collaborative network, where one or more PCB layout designing companies or designing parties, herein denoted as designers, collaborate with one or more PCB manufacturing companies or manufacturing parties, herein denoted as manufacturers.

Such PCB collaborative network may nowadays be implemented by means of a variety of software applications deployed in a mixed cloud and on-premise platform, where, for example, manufacturers share their own DFM profiles in a cloud data layer via a Software as a Service ("SaaS") and where designers are enabled to run their own DFM analysis applications against DFM profiles downloaded on their premises.

In a collaborative network deployed in such a mixed platform scenario, manufacturers upload their DFM profiles into the cloud and designers may request the cloud the authorization to download a selected DFM profile into their file systems on their premises in order to perform a local DFM analysis via their DFM analysis software tools.

In order to ensure a thrustful collaborative network environment, PCB manufacturers need to be enabled to share their manufacturing capability data in a controlled and secure manner to their selected PCB designers.

Therefore, it is desired an improved technique ensuring that manufacturers' DFM profiles shared in the cloud are utilized for on-premise DFM analysis only by the authorized designers.

SUMMARY OF THE DISCLOSURE

Various disclosed embodiments include methods, systems, and computer readable mediums for activating a PCB analysis utilizing manufacturing capability data shared in a multi-tenant collaborative network in a mixed cloud and on-premise environment. A method includes providing access to a tenant's account of a DFM application deployed on a tenant's premise, said DFM application being enabled to activate a PCB analysis on a DFM profile comprising manufacturing capability data. The method further includes requesting to a cloud data layer, via the tenant's account, an utilization authorization of a given DFM profile stored in the cloud data layer. The method further includes, in case of authorized utilization, downloading, into the premise, the given DFM profile embedded in a locked envelope, hereinafter called DFM envelope; the DFM envelope being generated by locking together the given DFM profile with an injected identifier identifying said authorized tenant's account. The method further includes, via the DFM application when logged into the tenant's account, activating a PCB analysis by permitting the unlocking of the DFM profile from the DFM envelope only when the identifier of the tenant's account is the same as the injected identifier.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 4 illustrates a flowchart of a method for activating a PCB analysis utilizing manufacturing capability data in accordance with disclosed embodiments.

DETAILED DESCRIPTION

Figure 1:
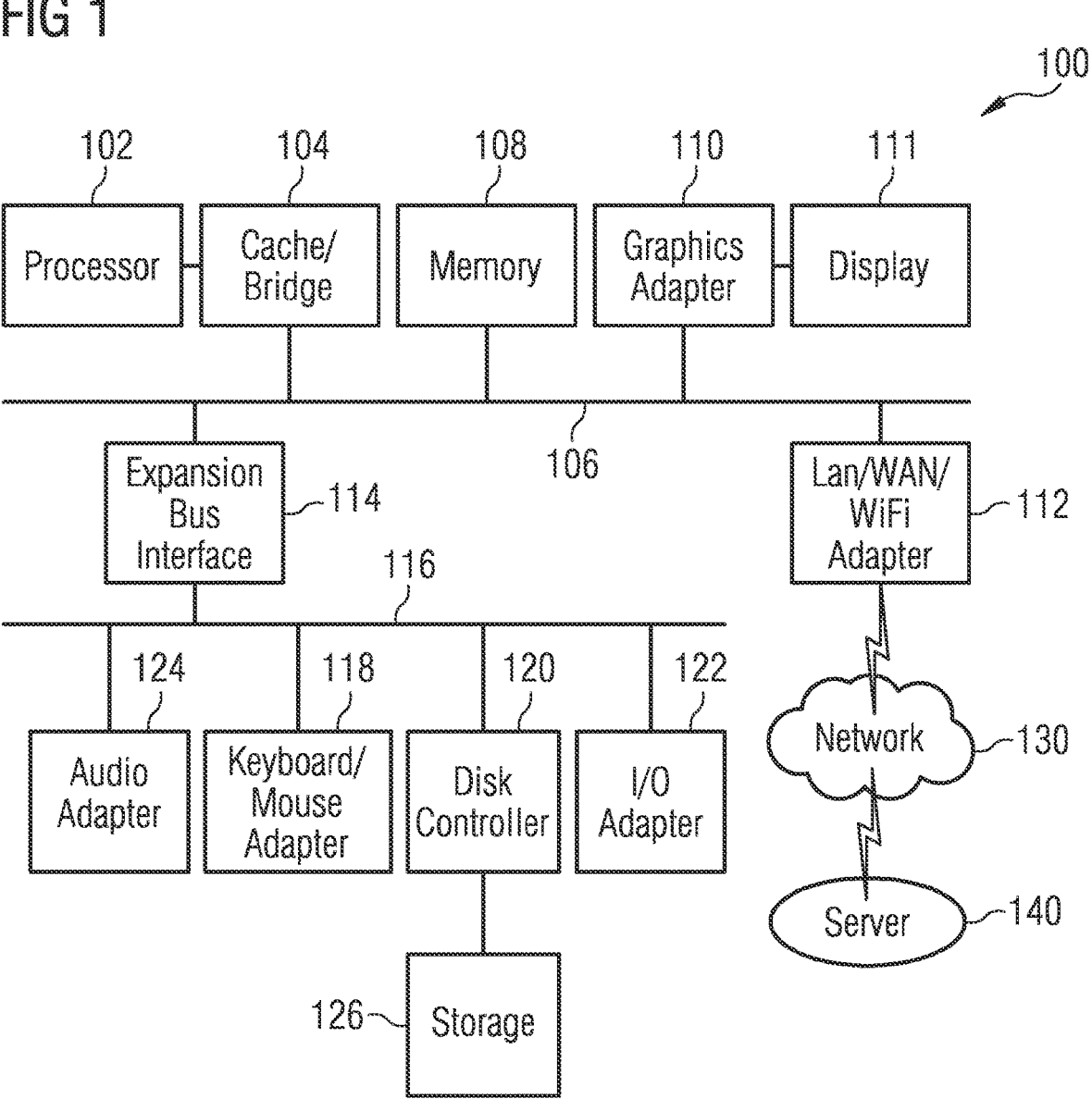
FIG. 1 illustrates a block diagram of a data processing system in which an embodiment can be implemented.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques did not enable a thrusted multi-party collaboration network in the field of PCB manufacturing design. The embodiments disclosed herein provide numerous technical benefits, including but not limited to the following examples.

Embodiments ensure that a DFM profile downloaded into a premise of a given authorized party can be utilized exclusively by this specific authorized party.

Embodiments prevent utilization of downloaded DFM profiles by no other party different than the authorized one in the cloud.

Embodiments prevent propriety data abuse by guarantying that the cloud sharing of manufacturing proprietary capability data is done exclusively with the authorized party.

Embodiments enable manufacturers to control and select which designer(s) among a pool of designers are authorized to download and use a selection of their own cloud-uploaded DFM profiles. Other embodiments enable manufacturers to control and select which designer(s) among a pool of designers are authorized to download, use and/or view and/or even modify a selection of their own cloud-uploaded DFM profiles.

Embodiments enable to implement an access control mechanism restricting DFM profile usage to one selected specific party.

Embodiments encourages manufacturers to collaborate in a PCB design network by sharing in the cloud their PCB manufacturing capability data with their selected authorized designers in a secure manner.

Embodiments enable manufacturers to manage the sharing of their own cloud-uploaded DFM profiles in a controlled manner.

Embodiments enable a controlled selective networking for PCB manufacturing data collaboration.

Embodiments generate a cooperative network among different parties in the PCB industry, i.e. one or more PCB manufacturers and one or more PCB designers, without putting the confidentiality of the proprietary manufacturing capability data at risk.

With embodiments, reliable PCB manufacturing design collaboration channels are advantageously created.

Embodiments apply to PCB design software applications in the PCB cloud applications domain in a mixed platform of cloud/SaaS and on-premise/client applications.

Embodiments foster a thrustful manufacturing capability data sharing environment between SaaS parties, i.e. the PCB manufacturers and the PCB designers.

Embodiments provide a cloud network solution to on-premise clients enabling exclusive data sharing capabilities.

Embodiments ensure exclusive utilization of DFM data downloaded from the cloud into the premise to be used (or even seen or even modified) by a DFM application.

Embodiments enable on-premises DFM applications of receiving real-time manufacturability rules directly from the cloud in a controlled manner.

In embodiments, once the envelope file downloaded into the premise network and saved in the tenant's file system, every user of the authorized tenant's account can conveniently activate a DFM analysis on that file, independently from the machine she/he is working on.

In embodiments, the collaboration allowance to a tenant is given through a cloud collaboration verification process.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
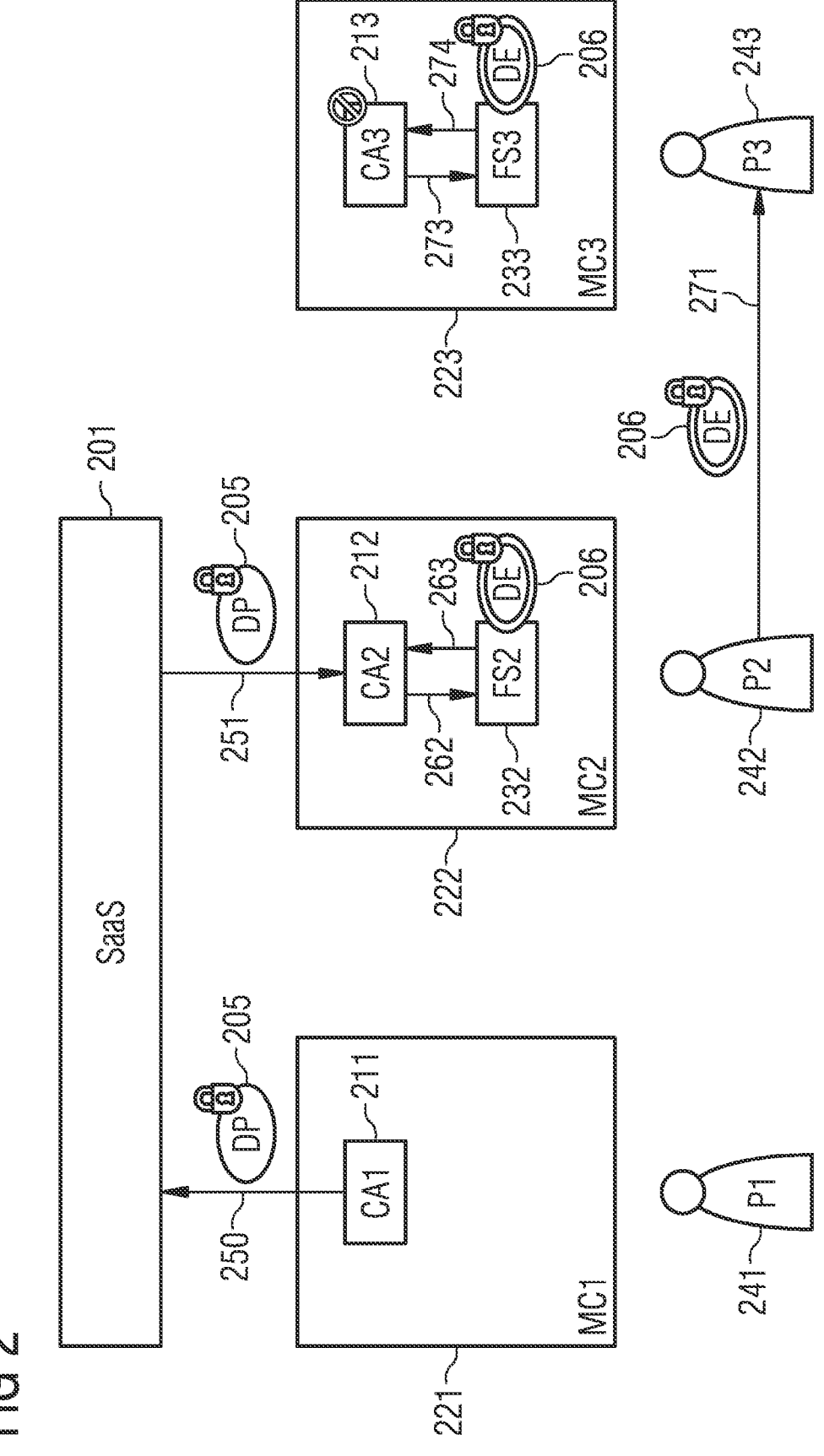
FIG. 2 illustrates a block diagram of a mixed cloud and premise collaborative platform in accordance with disclosed embodiments.

FIG. 2 illustrates a block diagram of a mixed cloud and premise collaborative platform in accordance with disclosed embodiments.

In the exemplary embodiment of FIG. 2, each of the three parties 241, 242, 243 of the collaboration network has its own client software application 211, 212, 213 residing in an own local machine 221, 222, 223 on an own premise. The first two client applications 211, 212 are able to exchange data with a data layer located in the cloud 201 where Software as a Service ("SaaS") applications form a collaborative controlled network in the PCB manufacturing domain.

Assume that the first party 241 is a PCB manufacturer and the second party 242 and the third party 243 are two different PCB designers, e.g. customer companies of the PCB manufacturer 241.

As used herein the term "party" may denote a company, e.g. a manufacturer or a designing company, or any user belonging to this same company and able to log herself/himself into the company's tenant account.

In this exemplary embodiment, the client application 212, 213 is a DFM analysis tool for the designers and a DFM profile editor 211 for the manufacturer, where the DFM profile editor 211 of the manufacturer 241 is compatible with the DFM analysis applications 212,213 of the designers 242, 243. For example, the designers 242, 243 may use a standalone DFM analysis tool 212, 213 and the manufacturer 241 may utilize a reduced version 211 of the designer's application. In other embodiments, the three client applications 211, 212, 213 are the same DFM analysis application. In embodiments, the three client applications 211, 212, 213 may be the same applications or compatible ones, for example different versions, lighter versions etc., or any mix thereof. In embodiments, at least one of the client applications 211, 212, 213 is a component or a submodule of a DFM application residing on the premise. In embodiments, at least one of the three client applications 211, 212, 213 is enabled to run a DFM analysis directly. In embodiments, the DFM analysis is performed on the premise. In embodiments, at least one of the three client applications 211, 212, 213 is enabled to run a DFM analysis indirectly by activation of a DFM analysis tool which can be partially of fully located on the premise or on the cloud. In embodiments, the client application requires a logging into the tenant's account in the cloud. Examples of DFM analysis tools 212, 213 include, but are not limited by, Valor PCB Manufacturing solutions, vNPI software solutions, PCBflow software solutions of Siemens Digital Industries Software Corporation.

The manufacturer 241 uploads 250 via its own client application 211 its manufacturing capability data 205 into the cloud 201 for collaboration purposes. The manufacturing capability data 205 have previously been encrypted by an encryption algorithm present in the client application 211. The manufacturer 241 uploads the encrypted data 205 into the cloud 201 and sets the party authorization. In this example, the manufacturer 241 authorizes designer 242 to use its own manufacturing capability data for DFM analysis purposes. The manufacturing capability data are the manufacturer's DFM profile 205. In embodiments, the manufacturer 241 may set other party authorizations beside "data usage" for example "data viewing capability" and/or "data modification capabilities", all such party authorization capabilities may conveniently be stored as "party authorization data" stored together with the manufacturing capability data.

At one point in time, the first designer 242, via its own tenant account, requests (not shown) the cloud an authorization to use or to perform other authorized actions on the DFM 205 profile of the manufacturer 241.

The authorization check (not shown) is performed in the cloud 201. In embodiments, the authorization check is a collaboration check which can be for example performed via the protocol JSON Web Token ("JWT").

Given that the first designer 242 was authorized by the manufacturer 241, the authorization check is then successful and the client application 212 receives 251 the encrypted DFM profile 205 from the cloud 201.

The client application 212 injects into the received data the authorized customer tenant identifier ("ID"), then it encrypts the data and saves 262 it into the file system 232 as a DFM envelop file 206. In embodiments, the DFM envelop 206 comprises at least a DFM profile 205 and an injected tenant ID.

In other embodiments, the DFM envelop generation is performed (not shown) in the cloud 201 and the client application 212 receives the DFM profile 206 already embedded into the DFM envelop file 206 with the injected ID of its tenant.

When the client application 212 requests 262 the usage of the DFM profile 205, the DFM envelop is uploaded 263 and a check is performed by comparing whether the tenant's ID injected in the data is identical to the ID of the client application tenant's account. Only if they are identical, the DFM profile data can be unlocked from the DFM envelop 206 and utilized, also according to the stored authorizations types, for DFM analysis purposes. In this case, the DFM analysis can be performed.

Assume that this first authorized designer 241 sends 271 the DFM envelop 206 to the second designer 243 via some file transport means, for example via Email and then the second designer 243 saves 272 the received DFM envelop 206 in the own file system 233 in the own local machine 223.

When the own local client application 213 uploads 274 the DFM envelop 253 from the file system 233, the client application 213 checks whether the tenant ID injected in the data is identical to its own tenant ID. Only if they are identical the DFM envelop 206 can be used the client application 213. In this case the DFM analysis cannot be performed because in the DFM envelop 206 the injected tenant ID is different than the ID of the tenant's account.

In summary, in embodiments, the client application 212, 213 loads the encrypted DFM envelop file 206 from the file system 232, 233, it decrypt the file, it extracts the tenant ID an compares it to the logged in user's tenant ID. If it is equal, i.e. a valid user, then the client application continues to handle the file by extracting the DFM profile 205 for activating a DFM analysis. If it is not equal, invalid user, then the client application rejects it and stops to handle it.

Advantageously, with embodiments, the DFM profile 205 data shared in the cloud 201 can be used only by the designer 242 that was authorized for its download and specific use type.

As used herein the term "tenant account" denotes a logical entity with unique ID also called tenant ID typically representing all the users in this tenant and, optionally, some other tenant's information such as tenant log, tenant name etc. Typically, a user who wishes to work on behalf of her/his tenant performs a log-in process against the cloud account. In embodiments, the login process is done preferably from the premise application. In other embodiments, the login process is done directly in the cloud. In embodiments, the premise application does not have a log-in into it and the account is on the cloud only. In embodiments, the premise application asks the user to login to the cloud and get permissions from the cloud. In embodiments, when a user logs in, he/she logs into a tenant account so that all such users belong to a same tenant. In embodiments, the received credentials include some user details, e.g. user's email, username, and tenant account details, e.g. tenant's ID. In embodiments, the received tenant's ID is used to generate the DFM envelop.

In embodiments, the DFM envelop is saved in the file system on the premise and can be unlocked by different users as long as such users belong to the same authorized tenant account of the tenant's ID injected within the file.

Advantageously, such users may be working on any other desired different machine on any device, on any hardware and can get the DFM profile on their file system for activating their DFM analysis.

Hence, once the envelope file is downloaded into the premise network and saved in the tenant's file system, every user of the authorized tenant's account can conveniently activate a DFM analysis on that file, independently from the machine she/he is working on.

Advantageously, in embodiments, a DFM analysis can be run by users logged into the authorized tenant's account on any machine or device, including a smartphone or a tablet and at any point of time.

Advantageously, the DFM profile file can be used independently from the machine type.

In embodiments, the DFM envelop can conveniently be used only by a client application with a logged tenant's account corresponding to the tenant ID previously injected into the DFM envelop.

In embodiments, information received from the cloud application in form of tenant's access tokens may conveniently be used.

In embodiments, a communication protocol which can be used for securely conveying 251 the tenant information to the client application may be JWT.

In embodiments, encryption mechanisms of the client applications may advantageously be utilized.

In embodiments, an encryption algorithm to be used is the encryption algorithm available inside the local application 212 for decrypting and re-encrypting, into the DFM envelop 206, the download DFM profile 205 together with the Unique tenant ID extracted from the JWT token.

In embodiments, the step of locking the DFM profile by injecting the tenant's ID into a generated DFM envelop file may preferably be done at the premise, for example by the client application. In other embodiments, the step of locking the DFM profile by injecting the tenant's ID into a generated DFM envelop file may be done in the cloud by the SaaS application.

In embodiments, the premise application receives data on the DFM profile and data on the tenant's account ID and generates with such data the DFM envelop.

In embodiments, the tenant ID is injected into the data in encrypted manner by the SAAS side just before it sends it to the authorized party.

In embodiments, the tenant ID can be used as part of the encrypted/decrypted key. The tenant ID can be injected within the encryption key. In embodiments, the general key that it used for all customers/parties can be mixed with the tenant ID, e.g hash function. Advantageously, embodiments guarantee a unique encryption key per tenant.

In embodiments, the data is advantageously kept unaltered given that the tenant ID is not injected into the data.

In embodiments, by creating a key that includes the tenant ID, a unique encryption key for each tenant is created and therefore higher security levels are guaranteed.

In embodiments, the authorized user's tenant ID is checked while using the data in order to ensure that such data can be used.

In embodiments, the manufacturer 241 uploads 250 the DFM profile 205 via its own premise application 211 and sets in its own cloud account the authorization for a selected designer 242. In embodiments, the manufacturer 241 is provided with the capability of encrypting its own DFM profile via its own premise application 211, where such encryption mechanism is compatible with the encryption mechanism of the designer's premise application 212, 213.

In embodiments, the manufacturer 241 is provided with the capability of setting in the cloud 201 an exclusive collaboration with a specific designer via its own cloud account (not shown). Through its own cloud account, the manufacturer can select a pool of designers to share some of its proprietary DFM profiles with. In embodiments, the manufacturer is enabled to select which designer is additionally enabled to view some data of the DFM profile. In embodiments, the manufacturer can set its own preferences and can expose in the cloud data interface the sharing authorizations of its own DFM profiles with a pool of designers. The sharing authorizations regard the manufacturing capability data utilization and optionally the viewing of such data. Conveniently, embodiments guarantee that the shared data are not fully disclosed even to an authorized party. In embodiments, the designer, upon request, gets a list of the DFM profiles 205, its users can utilize or partially/fully view.

Figure 3A:
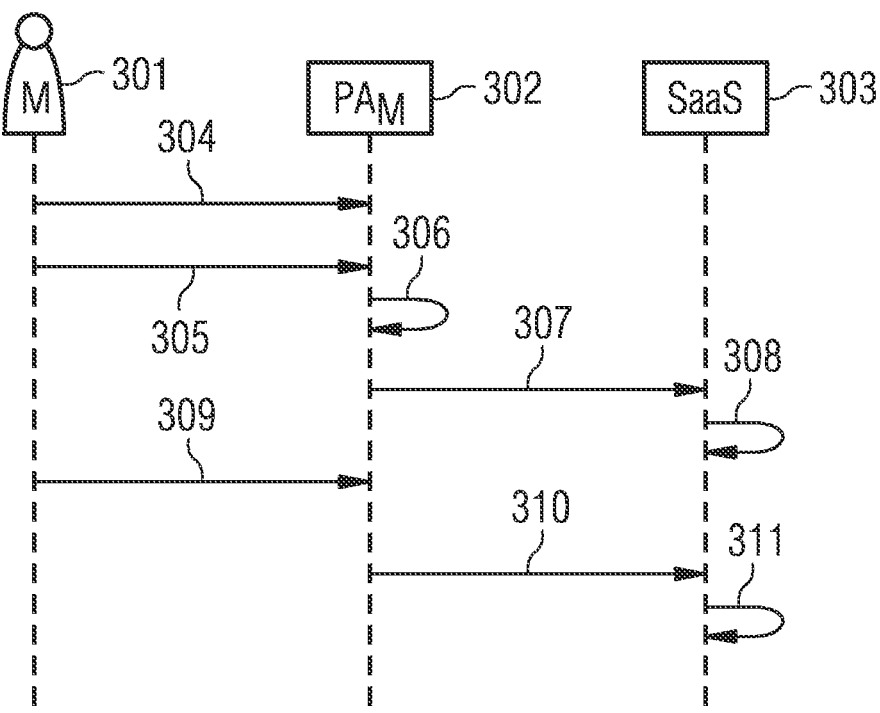
FIGS. 3A, 3B and 3C illustrate sequence diagrams for controlled sharing of a DFM profile in accordance with disclosed embodiments.
Figure 3B:
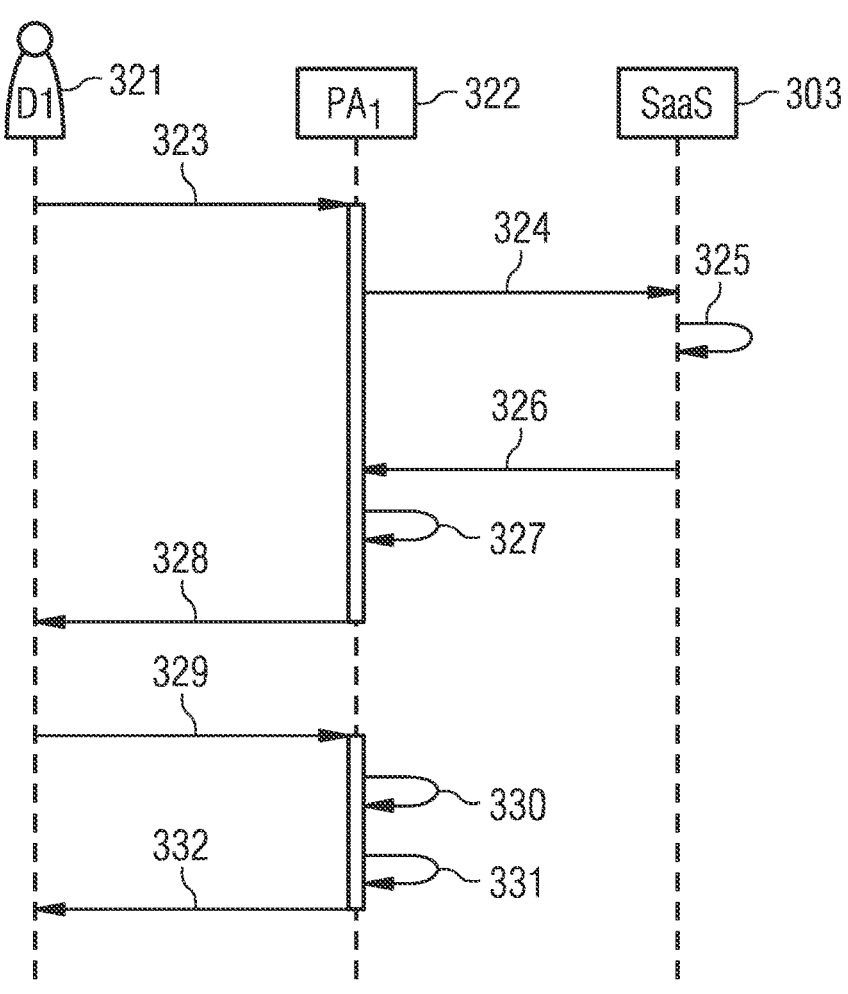
Figure 3C:
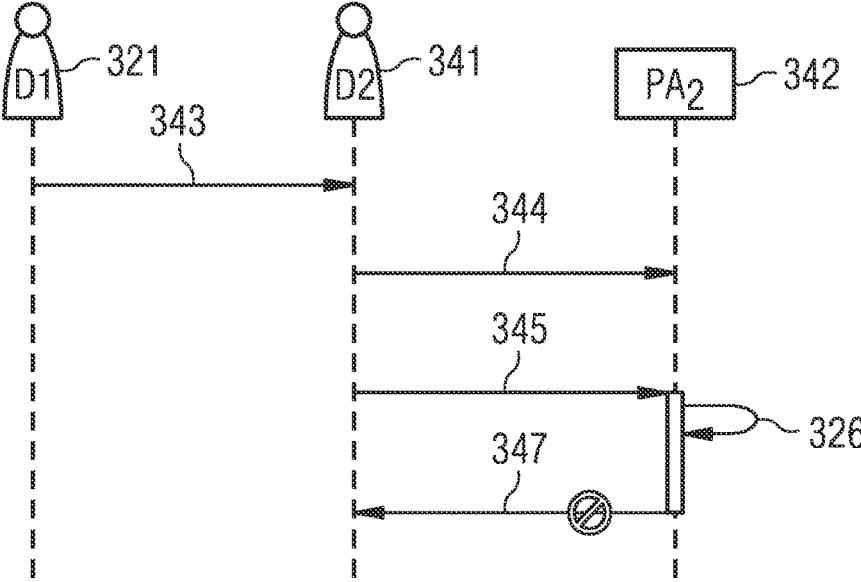

FIGS. 3A, 3B and 3C illustrate sequence diagrams for controlled sharing of a DFM profile in accordance with disclosed embodiments.

In this exemplary embodiment, three main phases are illustrated via FIGS. 3A, 3B and 3C: in the first phase, the manufacturer M uploads its proprietary DFM profile to the SaaS application and sets authorization sharing for the first designer D1; in the second phase, the first designer D1 connects to the SaaS application, downloads the shared DFM profile embedded in a DFM envelop with its own tenant's ID and uses it for DFM analysis; and, in the third phase, the first designer D1 sends the DFM envelop to the second designer D2 who is then unable to utilize the embedded DFM profile for DFM analysis. (in the figure) The sequence diagram of FIG. 3A illustrates the first phase where the manufacturer 301 uploads its proprietary DFM profile to the SaaS application 303 and sets authorization sharing for the designer D1.

The manufacturer 301 encrypts its own DFM profile via its own premise application "OnPremApp" 302 via the following exemplary actions:

"set up the DFM profile" 304;

"press "Save" button" 305;

"encrypt the DFM profile" 306.

The encryption is preferably done via the internal encryption solution of the premise application "OnPremApp" 302, advantageously such DFM profile may then be loaded only via another premise application "OnPremApp" 302 able to decrypt the DFM profile.

The encrypted DFM profile is then uploaded on the SaaS application 303 and authorized for usage by the first designer D1 via the following exemplary actions:

"upload the encrypted DFM profile" 307;

"it stores the encrypted DFM profile" 308;

"set sharing with the first designer D1" 309, where action 309 goes from the manufacturer 301 to the premise application 302;

"set exclusive collaboration between manufacturer M and the fist designer D1" 310, where action 310 goes from the premise application 302 to the SaaS application 303;

"it updates networking service" 311.

The SaaS application stores the collaboration details between the manufacturer M and the first designer D1 so that only designer D1 is authorized for use.

In other embodiments, not shown, the action of "set sharing with the first designer D1" and the action of "set exclusive collaboration between manufacturer M and the fist designer D1" may conveniently be directly performed in the SaaS 303 together with the action "it updates networking service" 311.

The sequence diagram of FIG. 3B illustrates the second phase where the first designer 321 connects to the SaaS application 303, downloads the DFM profile, embeds it into a DFM envelop and then uses it for DFM analysis via the following exemplary actions:

"get DFM profile of manufacturer M" 323, where action 323 goes from the first designer 321 to its own premise application OnPremApp 322;

"get DFM profile" 324, where action 324 goes from the premise application OnPremApp 322 to the SaaS application 303;

"it verifies the request" 325; for example, by checking that the requesting token is approved to the DFM profile, e.g. by a simple collaboration verification;

"send encrypted DFM profile" 326, where action 326 goes from the SaaS application 303 to the premise application 322;

"it signs the file with the ID of designer D1" 327; for example, this can be done by creating a DFM envelop file comprising the downloaded encrypted DFM profile, by encrypting the DFM envelop file and by destroying the encrypted DFM profile received from the cloud;

"Done" 328, where action 328 of sending "Done" message goes from the premise application OnPremApp 322 to the first designer 321;

"use DFM profile" 329;

"it verifies the DFM envelop" 330;

"working on it" 331;

"all OK" 332; where action 332 of sending "all OK" message goes from the premise application OnPremApp 322 to the first designer 321; the designer was for example able to run its own DFM analysis in its own file system.

In other embodiments, not shown, the action of "it verifies the DFM envelop" and the action of "working on it" may conveniently be performed in one stage.

Advantageously, the DFM profile locked in the DFM envelop file cannot be used via the premise application OnPremApp by any other designer other than the authorized designer.

The sequence diagram of FIG. 3C illustrates the third phase where the first designer D1 sends the DFM envelop to the second designer D2 who is then unable to utilize the embedded DFM profile for DFM analysis via the following exemplary actions:

"Hi pal, get this DFM envelop" 343, where action 343 of sending the DFM envelop goes from the first designer 321 to the second designer 341; for example, the DFM envelop file may be sent via any channel, e.g. via Email;

"upload the DFM envelop" 344; where action 344 goes from the second designer 341 to his/her own premise application OnPremApp 342;

"use DFM profile" 345;

"it verifies the DFM envelop" 346; it decrypts the envelop file and it verifies that the tenant's ID belongs to the designer D2; given that the injected ID is different than the ID of tenant D2 an error message is sent;

"Error: the DFM is not authorized" 347; where action 347 of sending the error message goes from the premise application 342 to the second designer D2 341.

With embodiments, manufacturers are able to share their own manufacturing capabilities with their own customers in a controlled and a safe manner.

FIG. 4 illustrates a flowchart 400 of a method for activating a PCB analysis utilizing manufacturing capability data in accordance with disclosed embodiments. Such method can be performed, for example, by system 100 of FIG. 1 described above, but the "system" in the process below can be any apparatus configured to perform a process as described.

The manufacturing capability data is preferably shared in a multi-tenant collaborative network in a mixed cloud and on-premise environment.

At act 405, it is provided access to a tenant's account of a DFM application deployed on a tenant's premise, said DFM application being enabled to activate a PCB analysis on a DFM profile comprising manufacturing capability data. In embodiments, the DFM application able of activating a DFM analysis may be just a (sub)-module of a full DFM analysis application.

At act 410, via the tenant's account, it is requested to a cloud data layer an utilization authorization of a given DFM profile stored in the cloud data layer. In embodiment, the utilization authorization is performed as a cloud collaboration request.

At act 415, in case of authorized utilization, it is downloaded, into the premise, the given DFM profile embedded in a locked envelope, hereinafter called DFM envelope; the DFM envelope being generated by locking together the given DFM profile with an injected identifier identifying said authorized tenant's account.

In embodiments, the DFM envelop is generated by the DFM application. In other embodiments, the DFM envelop is generated within the cloud. In embodiments, DFM envelop may include, beside the injected tenant ID, other data like the address, the name etc.

At act 420, via the DFM application when logged into the tenant's account, activating a PCB analysis by permitting the unlocking of the DFM profile from the DFM envelope only when the identifier of the tenant's account is the same as the injected identifier.

In embodiments, the DFM envelop is generated by performing the following sub-steps:

in case of encrypted DFM profile, decrypting the DFM profile generating the DFM envelop as a file comprising the DFM profile and the injected authorized identifier (e.g. inside the file header);

optionally, encrypting the DFM envelop.

In embodiments, the DFM envelop is generated by injecting the tenant ID within the encryption key.

In embodiments, the DFM envelop is generated by performing the following sub-steps:

in case of encrypted DFM profile, decrypting the DFM profile;

generating the DFM container from the DFM profile by encrypting the DFM profile into a file and by injecting the authorized identifier into the encryption key.

An exemplary algorithm embodiment comprise the following steps: downloading of the data, wherein the SAAS service makes sure to send the manufacturing capability data only to an authorized tenant and wherein the client application injects the tenant ID into the data and encrypt it as a data envelop before saving into the file system; and, processing of the data: wherein the client application decrypts the data, compares the tenant ID inside the data with the one belonging to the using tenant and only if they are identical it allows the processing of the data for DFM analysis purposes.

In embodiments, the party cannot decrypt and use the manufacturing data independently, the manufacturing capability data can advantageously be utilized only through the DFM client application, the DFM client application can activate or perform a DFM analysis by on the unlocked DFM profile data.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for activating, by a data processing system, a printed circuit board (PCB) analysis utilizing manufacturing capability data shared in a multi-tenant collaborative network in a mixed cloud and on-premise environment, the method comprising:

providing access to a tenant's account of a design-for-manufacturability (DFM) application deployed on the tenant's premises, the DFM application being enabled to activate a PCB analysis on a DFM profile comprising manufacturing capability data;

via the tenant's account, requesting to a cloud data layer a utilization authorization of a given DFM profile stored in the cloud data layer;

when the utilization is authorized, downloading to the tenant's premises the given DFM profile embedded in a locked DFM envelope, the locked DFM envelope being generated by locking together the given DFM profile with an injected identifier identifying the authorized tenant's account; and while logged into the tenant's account, activating via the DFM application the PCB analysis by permitting the unlocking of the DFM profile from the locked DFM envelope only when the identifier of the tenant's account matches the injected identifier.

2. The method according to claim 1, which comprises requesting the utilization authorization of the given DFM profile as a cloud collaboration request.

3. The method according to claim 1, which comprises generating the locked DFM envelope within the cloud.

4. The method according to claim 1, which comprises generating the locked DFM envelope by performing the following:

if the DFM profile is an encrypted DFM profile, decrypting the DFM profile;

generating the DFM envelope as a file comprising the DFM profile and the injected authorized identifier; and optionally encrypting the DFM envelope.

5. The method according to claim 1, which comprises generating the DFM envelope by injecting a tenant ID within the encryption key.

6. A data processing system, comprising:

a processor; and an accessible memory, the data processing system with said processor being configured to:

a) provide access to a tenant's account of a design-for-manufacturability (DFM) application deployed on a tenant's premises, said DFM application being enabled to activate a printed circuit board (PCB) analysis on a DFM profile comprising manufacturing capability data;

b) via the tenant's account, request from a cloud data layer a utilization authorization of a given DFM profile stored in the cloud data layer;

c) in case of an authorized utilization, download to the tenant's premises, the given DFM profile embedded in a locked envelope, the locked DFM envelope being a DFM envelope generated by locking together the given DFM profile with an injected identifier identifying the authorized tenant's account;

d) via the DFM application, when logged into the tenant's account, activate the PCB analysis by permitting the unlocking of the DFM profile from the DFM envelope only when the identifier of the tenant's account matches the injected identifier.

7. The data processing system according to claim 6, wherein the request of item b) is performed as a cloud collaboration request.

8. The data processing system according to claim 6, wherein the locked DFM envelope is generated within the cloud.

9. The data processing system according to claim 6, wherein the locked DFM envelope is generated by:

if the DFM profile is an encrypted DFM profile, decrypting the DFM profile;

generating the locked DFM envelope as a file comprising the DFM profile and the injected authorized identifier; and optionally encrypting the DFM envelope.

10. The data processing system according to claim 6, wherein the locked DFM envelope is generated by injecting a tenant ID within the encryption key.

11. A non-transitory computer-readable medium encoded with executable instructions which, when executed, cause one or more data processing systems to:

a) provide access to a tenant's account of a design-for-manufacturability (DFM) application deployed on a tenant's premises, said DFM application being enabled to activate a printed circuit board (PCB) analysis on a DFM profile comprising manufacturing capability data;

b) via the tenant's account, request to a cloud data layer a utilization authorization of a given DFM profile stored in the cloud data layer;

c) in case of an authorized utilization, download, to the tenant's premises, the given DFM profile embedded in a locked DFM envelope; the DFM envelope being generated by locking together the given DFM profile with an injected identifier identifying the authorized tenant's account; and d) via the DFM application when logged into the tenant's account, activate a PCB analysis by permitting the unlocking of the DFM profile from the DFM envelope only when the identifier of the tenant's account matches the injected identifier.

12. The computer-readable medium according to claim 11, wherein the request of item b) is a cloud collaboration request.

13. The computer-readable medium according to claim 11, wherein the DFM envelope is generated within the cloud.

14. The computer-readable medium according to claim 11, wherein the DFM envelope is generated by performing the following steps:

if the DFM profile is an encrypted DFM profile, decrypting the DFM profile;

generating the DFM envelope as a file comprising the DFM profile and the injected authorized identifier;

optionally, encrypting the DFM envelope.

15. The computer-readable medium according to claim 11, wherein the DFM envelope is generated by injecting the tenant ID within the encryption key.

* * * * *